R. B. NISBET, Jr.
DUPLEX RECORDING CARDS.
APPLICATION FILED NOV. 13, 1918.

1,303,106.

Patented May 6, 1919.
2 SHEETS—SHEET 1.

INVENTOR
R. B. NISBET JR.
ATTORNEYS

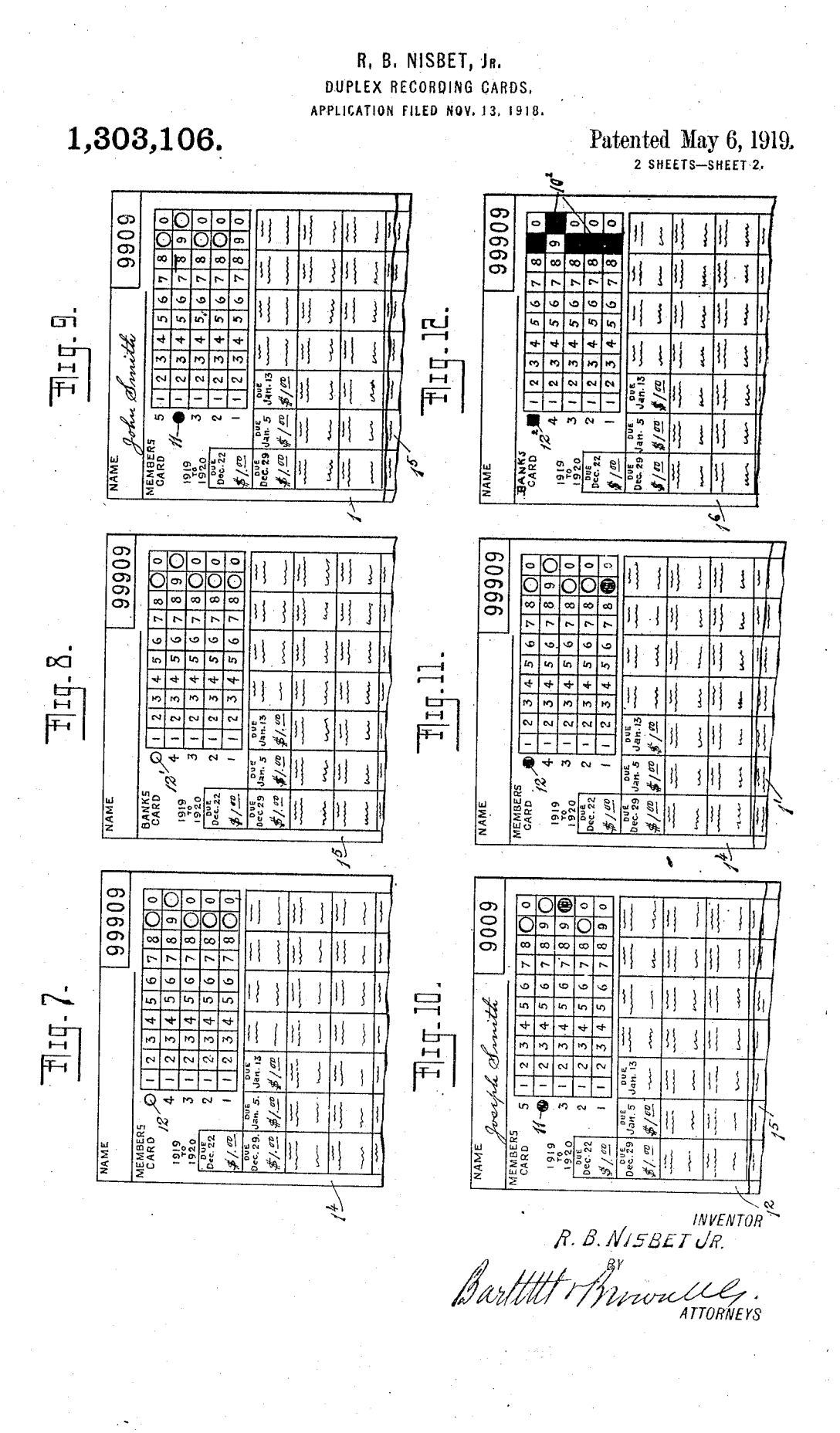

R. B. NISBET, Jr.
DUPLEX RECORDING CARDS.
APPLICATION FILED NOV. 13, 1918.

1,303,106.

Patented May 6, 1919.
2 SHEETS—SHEET 2.

INVENTOR
R. B. NISBET JR.
BY
Bartlett & Brownell
ATTORNEYS

UNITED STATES PATENT OFFICE.

ROBERT B. NISBET, JR., OF LARCHMONT, NEW YORK, ASSIGNOR TO BANKERS SERVICE CORPORATION, OF NEW YORK, N. Y., A CORPORATION OF NEW YORK.

DUPLEX RECORDING-CARDS.

1,303,106.  Specification of Letters Patent.  Patented May 6, 1919.

Application filed November 13, 1918. Serial No. 262,301.

*To all whom it may concern:*

Be it known that I, ROBERT B. NISBET, Jr., a citizen of the United States, residing at Larchmont, county of Westchester, State of New York, have invented certain new and useful Improvements in Duplex Recording-Cards, of which the following is a full, clear, and exact description.

My invention relates to recording cards and has for its object to provide a new and improved visual means for indicating whether two cards belonging to different sets correspond to one another. It further has for its object to provide a new and improved means constituting a visual check as to whether or not two cards used in a bank deposit system or the like bear the same identifying or account number or name. In my system one of two corresponding cards is preferably perforated while the other has corresponding punched or printed indications.

The following is a description of an embodiment of my invention, reference being had to the accompanying drawings, which are designed for a bank deposit system, in which, Figure 1 represents a member's card;

Fig. 2 a corresponding bank card;

Fig. 3 represents a card of Fig. 1 superimposed over a card of Fig. 5;

Fig. 4 represents another customer's card;

Fig. 5 represents a corresponding bank card;

Fig. 6 represents a card of Fig. 4 superimposed over a card of Fig. 2;

Fig. 7 represents another customer's card bearing an account number including a larger number of figures;

Fig. 8 represents the corresponding bank's card;

Fig. 9 represents a card of Fig. 1, superimposed upon the card of Fig. 8;

Fig. 10 represents the card of Fig. 4 superimposed upon the card of Fig. 8;

Fig. 11 represents the card of Fig. 7 superimposed upon the card of Fig. 2; and, Fig. 12 represents the card of Fig. 8 modified by the substitution of printed indications for perforations.

The cards of Figs. 1 to 6 belong to one series in which the account numbers have four figures, the cards of Figs. 7 and 8 belong to another series in which the account numbers have five figures.

Referring more particularly to the drawings, 1, $1^2$, and $1^4$ are cards issued by a bank to three depositing members, each having at its upper right-hand corner a distinguishing numeral 2 indicating the number of the account of the member, that of Fig. 1 being "9909." Each card also has a space 3 for the member's name and has transaction record spaces 4 having dates 5 arranged in chronological order showing the times at which payments are to be made and also having an indication 6 of the amount due upon any such date. Below the account number is a table 7 in which are five rows of numbers 1, 2, 3, 4, 5, 6, 7, 8, 9, 0, placed one below the other, there being at the left-hand a column 8 containing the numerals 1, 2, 3, 4, 5, used to indicate the number of figures in the account number as hereinafter described. $1'$, $1^3$ and $1^5$ are bank's cards, Fig. 2, containing similar subject matter as appears at $2'$, $3'$, $4'$, etc., but are of a different color from the member's card. Thus, the member's card may be blue while the bank's card is of some contrasting color such as pink.

The spaces in the five rows of the table 7 corresponding to the numeral of the account are punched out so as to produce registering perforations in both the bank's card and the member's card, all the perforations of one card registering with all the perforations of the other corresponding card as at 9, $9'$ Figs. 1 and 2, or 10, $10'$ in cards $1^2$ and $1^3$ respectively of Figs. 4 and 5. In column 8 the numeral corresponding to the number of integers in the account number is also punched out, as shown at 11, $11'$ in Figs. 1 to 6 inclusive, in which cases, the account numbers each having four integers, the series numeral four is punched out. Where the account number has five integers as shown in Figs. 7 and 8 (99909) the series indicating numeral 5 is punched out, as shown at 12, $12'$ in cards $1^4$ and $1^5$ respectively. The punching may be done at the time the bank issues the card but is preferably done by the manufacturer of the card, who also preferably applies the account numbers to the member's card and the corresponding bank's card and punches accordingly.

Upon issuing these cards, the bank fills in the name of the member upon a member's card and the bank's card having the corresponding account numeral.

The result of the punchings is that if the bank's card responding to a member's card is rightly selected and the cards are superimposed, all the perforations in member's card will be uncovered by perforations in the bank's card, or vice versa, the numeral of one card corresponding to the numeral of the other card. If, however, the bank's card has not been rightly selected so that the numeral or name of one card does not correspond to the other card, the punchings in the two cards will not correspond, and one or more of the perforations in the member's card will expose a portion of the wrongly selected bank's card, as in Fig. 3 in which card of Fig. 1 is superimposed on card of Fig. 5.

Cards such as above illustrated with proper punchings may be used with accounts numbering from 1 to 99,999. Such numbers being made up of series including from 1 to 9 and containing a number from one row of table 7; a series extending from 10 to 99, made up of numbers from two rows of table 7, a series extending from 100 to 999 and made up of numbers from three rows of table 7; a series extending from 1000 to 9999 and made up of figures from four rows of table 7; and a series beginning with 10,000 and ending with 99,999 and made up of figures from five rows of table 7. When the system is used for a small bank, the fourth series containing four numbers, in which series there are 9000 numbers, is generally used. For larger banks the fifth series, in which there are 90,000 numbers, is used. For still larger banks, the fourth and fifth series extending from 10,000 to 99,999, which will accommodate 99,000 accounts, can be used. Since all the cards of the same series have the same corresponding number in column 8 punched out it results that where two account numbers from two series are used and a member's card of one series is superimposed over a bank's card of another series, or vice-versa, the card which is underneath will always show through the perforations in column 8 of the superimposed card; that is, the perforation corresponding to the series of the superimposed card will always expose a portion of the card below, as shown in Fig. 9. Where a card having an account number from the fifth series is placed under the card of the fourth series, whose account number is the same so far as concerns the first four figures, the superimposed card will expose the other card through the series perforation as shown at 10. Where the cards belong to different series and their account numbers do not have the same groupings, the under card will show through the perforations in column 8 and also through one or more of the numeral perforations as shown in Figs. 10 to 11.

By these means a visual check or danger signal is established so that if the teller makes a mistake in reading the number upon either card, that fact is clearly indicated by the failure of some perforation, either series or numeral, or both, to be uncovered, thus helping to insure that no record will be made upon the wrong bank card, since, as used, the perforations will indicate whether or not the card taken out is the right card. No comparison of numbers is necessary to determine the fact. When the right cards are superimposed a record is made on both cards by punching in the proper one of the record spaces 4.

The perforations serve for a check when the bank card is identified and selected, either by name or by number, and is useful for that purpose with cards which bear a member's name but do not bear an account number. Where the cards do not bear account numbers the bank's cards would be kept arranged in alphabetical order. When the bank's cards are not arranged alphabetically or have an account number without the members name, they would be kept in numerical order.

The system calls for two sets of cards such as those of Figs. 1 to 6, one set being composed of members' cards and the other being composed of banks' cards, each member's card corresponding to one and only one bank's card, both as to its identifying punching and account number or name.

It is to be noted that the checking indications are so disposed that some of the perforations on card $1'$ will register with some of the perforations on card $1^2$ and with some of the perforations on card $1^3$, but that all of the perforations on card $1'$ will not register with all of the perforations on card $1^2$ or card $1^3$ when the cards are superimposed. In the cards shown the checking perforations which do not register with indications on other cards are so located that non-registering indications of two cards do not even partially overlap and that is the preferred arrangement. The registration of some perforations and the non-registration of others on cards which are not mates results from the fact that the locations of the perforations are determined in accordance with a definite plan and not left to accident or chance. The substantially exact registration of some indications on non-corresponding cards renders the non-registration of other indications more conspicuous and the definite plan for locating the indications insures the absence of any approximately exact registration of two indications on cards which do not constitute a pair.

As shown and described, the location of the checking indications on any card bears a definite relation to the account number on that card.

As a modification the card which is placed beneath the superimposed perforated card may have printed indications, such as dots, of any desired shape placed thereon in lieu of perforations. This modification is shown upon card $1^6$ of Fig. 12, in which such indicating dots are shown at $10^2$ and $12^2$ with which all the perforations of card $1^4$, Fig. 7, register, but with which all of the perforations of no other member's card register. In such case the unperforated cards may be white and the dots of a contrasting color such as red or black so as to give a distinct indication when a perforated card is superimposed. Thus, if the superimposed card were blue and the other card were white with red dots and one or more white spaces appeared the teller would know that he had made an error in selecting the bank's card. The printed indications have the advantage of not weakening the card so much as indications in the form of perforations, but because the perforations are not alterable by wear I prefer to have the printed indications, when used, upon the bank's cards. The use of perforations as indications on the cards of both sets has the advantage that the indications can be made on a pair of cards simultaneously by punching them when they are superimposed upon one another, thus insuring proper registration of the indications of corresponding cards. The perforating is also an easy way of making an indicating window in one card for observing the presence or absence of registering indication on the other card.

As will be evident to those skilled in the art, my invention permits of various modifications without departing from the spirit thereof or the scope of the appended claims.

What I claim is:

1. In a card system for recording purposes, two sets of cards, each being made up of a plurality of cards having an equal number of checking indications, the checking indications of each card in each set all registering with all the checking indications of one card of the other set when superimposed thereon and being different in arrangement from the indications of any other card of its set, those cards of both sets being provided with similar transaction record spaces.

2. In a card system for recording purposes, two sets of cards, each set being made up of a plurality of cards having an equal number of checking indications, the checking indications of each card in one set all registering with all the checking indications of one card of the other set when superimposed thereon and being so disposed that some of the checking indications of the cards of one set register with some of the checking indications on some of the other cards belonging to its set when superimposed thereon and so that some of them do not register with indications of said other cards when superimposed thereon.

3. In a card system for recording purposes, two sets of cards, each set being made up of a plurality of cards having an equal number of checking indications, the checking indications of each card in each set all registering with all the checking indications of one card of the other set when superimposed thereon and being so disposed that some of the checking indications of cards of one set are in register with checking indications on non-corresponding cards of the other set and some are out of register with indications on such non-corresponding cards and do not overlap when the cards are superimposed one upon the other.

4. In a card system for recording purposes, two sets of cards, each set being made up of a plurality of cards, one set having an equal number of checking perforations and the other set having the same number of checking indications, the checking perforations of each card in the first named set all registering with all the checking indications of one card of the other set when superimposed thereon and being so disposed as to not register with all the checking indications of any other of said cards when superimposed thereon, each card having similar transaction recording spaces.

5. In a card system for recording purposes, two sets of cards, each set being made up of a plurality of cards, one set having an equal number of checking perforations and the other set having the same number of checking indications, the checking perforations of each card in the first named set all registering with all the checking indications of one card of the other set when superimposed thereon and being so disposed as to not register with all the checking indications of any other of said cards when superimposed thereon, those cards having perforations and indications all registering with one another being provided with like distinguishing account numbers and with similar transaction recording spaces.

6. In a card system for recording purposes two sets of cards of one series, each set being made up of a plurality of cards, the cards of one set all having an equal number of checking indications and the cards of the other set all having the same number of checking indications, the checking indications of each card in the first named set all registering with the checking indications of one card of the other set when superimposed thereon and being so disposed as not to register with all the checking indications of any other card of said series when superimposed thereon, and two other sets of cards of a second series having a larger equal number of checking indications, the cards of the first series having series indications registering with one another when the cards are superimposed, said series indications when cards of the two series are superimposed upon one another registering with a space upon any card of the second series which is distinguishable from all series indications upon cards of the first series.

7. In a card system for recording purposes, two sets of perforated cards, each set being made up of a plurality of cards having an equal number of checking perforations, the checking perforations of each card in each set all registering with all of the checking perforations in one card of the other set when superimposed thereon, and being different in arrangement from the perforations of any other card of its set, each card having similar transaction recording spaces.

8. In a card system for recording purposes, two sets of perforated cards belonging to one series, each set being made up of a plurality of cards having an equal number of checking perforations, the checking perforations of each card in each set all registering with all of the checking perforations in one card of the other set, and being different in arrangement from the perforations of any other card of its set, and two similar sets of cards belonging to another series and each having an additional checking perforation, each of the cards of the lower series having a series perforation registering with a similar perforation in any card of its series and exposing a portion of any card of the other series when a card of the first series is superimposed over a card of said other series.

9. In a card system for recording purposes, two sets of perforated cards belonging to one series, each set being made up of a plurality of cards having an equal number of checking perforations, the checking perforations of each card in each set all registering with all of the checking perforations in one card of the other set, and being different in arrangement from the perforations of any other card of its set, and two similar sets of cards belonging to another series and each having an additional checking perforation, the cards of each series having a series indicating perforation, the series perforations in the cards of each series being placed so as to register with the series perforations in any card of its series when superimposed thereon but not to register with the series perforations of any card of the other series.

10. In a card system for recording purposes, two sets of cards, each set being made up of a plurality of cards having an equal number of checking indications, the checking indications of each card in each set all registering with all of the checking indications in one card of the other set when superimposed thereon, and being different in arrangement from the indications of any other card of its set, those cards having like indications being provided with like distinguishing account numbers, said cards having also similar transaction record spaces, the position of said indications being definitely related to said account numbers.

ROBERT B. NISBET, Jr.

Copies of this patent may be obtained for five cents each, by addressing the "Commissioner of Patents, Washington, D. C."